United States Patent

Lilleberg et al.

[11] Patent Number: 5,881,097
[45] Date of Patent: Mar. 9, 1999

[54] CALCULATING ESTIMATES AND DECISIONS OF PARAMETERS FOR RECEIVER

[75] Inventors: Jorma Lilleberg; Markku Juntti, both of Oulu, Finland

[73] Assignee: Nokia Mobile Phones Limited, Salo, Finland

[21] Appl. No.: 742,064

[22] Filed: Oct. 31, 1996

[30] Foreign Application Priority Data

Nov. 2, 1995 [FI] Finland ..................................... 955269

[51] Int. Cl.⁶ .............................. H04B 15/00; H04K 1/00; H04L 27/30
[52] U.S. Cl. ........................... 375/203; 375/203; 375/200; 375/201; 375/202; 375/206; 375/207; 375/208; 375/210; 375/340; 375/343; 370/319; 370/320; 370/335; 370/342; 370/479
[58] Field of Search ...................................... 375/203, 200, 375/201, 202, 204, 206, 207, 208, 209, 210, 340, 343; 370/320, 321, 335, 336, 441, 342, 442, 319, 337, 341–345, 479–480, 498

[56] References Cited

U.S. PATENT DOCUMENTS

| 4,755,983 | 7/1988 | Masak et al. | 375/207 |
| 5,218,619 | 6/1993 | Dent | 270/209 |
| 5,363,403 | 11/1994 | Schilling et al. | 375/206 |
| 5,553,062 | 9/1996 | Schilling et al. | 370/207 |
| 5,579,304 | 11/1996 | Sugimoto et al. | 370/342 |
| 5,619,503 | 4/1997 | Dent | 370/330 |

*Primary Examiner*—Stephen Chin
*Assistant Examiner*—Michael W. Maddox
*Attorney, Agent, or Firm*—Perman & Green, LLP

[57] ABSTRACT

A receiving method and a receiver comprising circuit elements that are arranged to calculate estimates for parameters of a received signal in two or more stages, for processing the signal iteratively by means of an observation time-slot of a given length and containing a plurality of samples, and for sliding the observation time-slot over the received samples. In order to avoid complicated matrix operations, the receiver comprises circuit elements for sliding the observation time-slot in such a way that successive observation time-slots partly overlap, and for employing, upon calculating the estimates and decisions of parameters in each observation time-slot, estimates provided by the previous observation time-slot as initial values for those samples that fall within the previous observation time-slot, and estimates provided by the previous stage for those samples that do not fall within the previous observation time-slot.

13 Claims, 3 Drawing Sheets

CALCULATING ESTIMATES AND DECISIONS OF PARAMETERS FOR RECEIVER

FIELD OF THE INVENTION

The invention relates to a receiving method comprising the steps of: taking samples from a received signal, measuring from the received signal mutual delays of transmissions contained in the signal and the strengths of the transmissions originating from one or more transmitters, and calculating estimates for parameters of the received signal in two or more receiver stages, the signal being processed iteratively in one of the latter stages by means of a sliding observation time-slot of a given length, containing a plurality of samples.

PRIOR ART

One central problem in the design and implementation of telecommunications systems is simultaneous transmission of signals to and reception from several simultaneous users such that the interference between the signals is minimal. Due to this and the transmission capacity used, various transmission protocols and multiple access methods have been developed, the most common in mobile communication being FDMA (Frequency Division Multiple Access) and TDMA (time Division Multiple Access) methods, and recently the CDMA (Code Division Multiple Access) method also. The present invention may be applied in any above-mentioned multiple access method. It is particularly advantageous to apply the invention in the CDMA-based systems, but it may also be applied advantageously in FDMA and TDMA systems when the interference levels become higher.

The CDMA is a multiple access method based on a spread spectrum technique, and it has recently been applied in cellular radio systems in addition to previously used FDMA and TDMA. CDMA has many advantages over the prior methods, such as simplicity of the frequency planning, and spectrum efficiency. The invention will be described below by way of example in a direct spread CDMA system. The invention may also be implemented linearly in other broad- and narrowband systems.

In the direct spread CDMA method, a narrowband data signal of a user is multiplied to a relatively broad band by a spreading code having a much broader band than the data signal. Band widths used in prior art test systems include e.g. 1.25 MHz, 10 MHz and 25 MHz. During the multiplication, the data signal spreads over the entire band to be used. All the users transmit simultaneously on the same frequency band. On each connection between a base station and a mobile station, a different spreading code is used, and the signals of the users can be distinguished from each other in the receivers on the basis of each user's spreading code. If possible, the spreading codes are selected in such a way that they are mutually orthogonal, i.e. they do not correlate with one another.

Correlators in conventionally implemented CDMA receivers are synchronized with a desired signal, which is recognized on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is thus to detect the signal of the desired user from among a number of interfering signals. In practice, the spreading codes correlate, and the signals of other users make it more difficult to detect the desired signal since they distort the received signal. This interference caused by the users to one another is called multiple access interference.

A particularly problematic situation arises when one or more users have a remarkably higher signal strength than the other users. These users having a high signal strength cause considerable interference to the connections of other users. Such a situation is termed as a near-far problem, and it may arise e.g. in cellular radio systems when one or more users are located near a base station and a group of users are located more remote, whereby the users situated near the base station cover the signals of other users in the base station receiver unless the power control algorithms employed by the system are extremely fast and effective.

Reliable reception of signals is problematic particularly in asynchronous systems, that is, systems in which the users' signals are not in synchronism with one another, because the users' symbols are interfered by the large number of symbols of other users. Filters matched with spreading codes, and sliding correlators used as detectors in conventional receivers function poorly, however, in near-far situations. Among the prior art methods, a more functional solution is provided by multiuser detectors, such as a decorrelating detector, which eliminates multiuser interference from the received signal by multiplying it by a cross-correlation matrix of the spreading codes used. The decorrelating detector and its prior art implementations are described in greater detail in Lupas, Verdu: Linear multiuser detectors for synchronous code-division multiple access channels, IEEE Transactions on Information Theory, vol 35, no.1, pp. 123–136, Jan 1989 and Lupas, Verdu: Near-far resistance of multiuser detectors in asynchronous channels, IEEE Transactions on Communications, vol 38, Apr 1990, which are incorporated herein by reference. These methods, however, require operations demanding plenty of calculational capacity, such as matrix inversion operations, particularly if the user's code varies symbol by symbol. The matrix inversion operations are especially demanding particularly when the quality of the transmission channel and the number of users vary constantly, which is the case e.g. in cellular radio systems.

SUMMARY OF THE INVENTION

It is thus an object of the present invention to provide a receiving method and a receiver that allow efficient multiuser detection of signals without complex matrix operations regardless of whether the user's code varies symbol by symbol or whether it is repeated periodically.

It is another object of the invention to provide a receiving method that may be applied, in addition to multiuser detection, to estimating complex attenuation co-efficients of a single-/multipath channel of one or several users.

This is achieved with a method disclosed in the introduction, characterized in that successive observation time-slots partly overlap, and that upon calculating the estimates of the parameters in each time-slot, estimates and decisions provided by the previous observation time-slot are used as initial values for those samples that fall within the previous observation time-slot, and estimates provided by the previous stage for those samples that do not fall within the previous observation time-slot.

The invention further relates to a receiver comprising means for measuring from a received signal mutual delays of transmissions contained by the signal, and strengths of transmissions received from one or more transmitters;

means that are arranged to calculate estimates for parameters of the received signal in two or more stages; means for taking samples of the received signal; means for processing the signal iteratively by means of an observation time-slot of a given length and containing a plurality of samples; and means for sliding the observation time-slot over the received samples. The receiver of the invention is characterized by comprising means for sliding the observation time-slot in such a way that successive observation time-slots party overlap; and means for employing, upon calculating the estimates and decisions of parameters in each observation time-slot, estimates provided by the previous observation time-slot as initial values for those samples that fall within the previous observation time-slot, and estimates provided by the previous stage for those samples that do not fall within the previous observation time-slot.

The method of the invention may advantageously be applied in connection with decorrelating detection or detection or estimation that minimize the mean square error. The method of the invention utilizes iterative solution methods of linear equations, such as a conjugate-gradient method (GC method). In the solution according to the invention, signal samples are studied by means of a limited observation window which is slid over the samples in such a way that successive windows partly overlap. During successive iteration cycles, estimates calculated in the previous observation window are used as initial values in so far as they exist. Values obtained from the previous stage of the receiver, typically from the matched filters, are used as other initial values. This method allows the iteration to converge rapidly.

In the solution of the invention, matrix inversion operations are avoided, which are so demanding that they have not been applied in receivers in practice.

BRIEF DESCRIPTION OF THE DRAWINGS

In the following, the invention will be explained in greater detail with reference to the examples in the attached drawings, in which.

DESCRIPTION OF THE PREFERRED EMBODIMENTS

In the solution of the invention samples are taken from a received signal, which has possibly been processed in some way. The received sampled signal is observed during an observation time-slot extending over several data symbols, and estimation of symbols is carried out on the basis of said observation time-slot.

The receiving method of the invention may be applied both in a synchronous and an asynchronous system. The method is suited for use regardless of the number of users or the number of multipath-propagated signal components of each user.

Figure 1A:
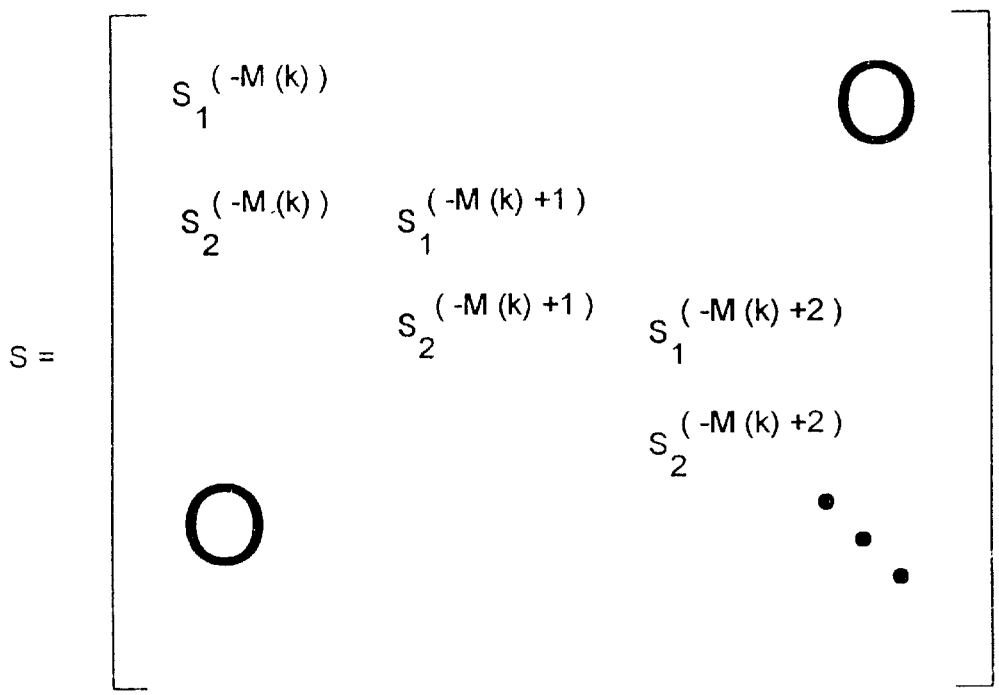
FIGS. 1a and 1b illustrate a matrix containing the waveforms of the users.
Figure 1B:
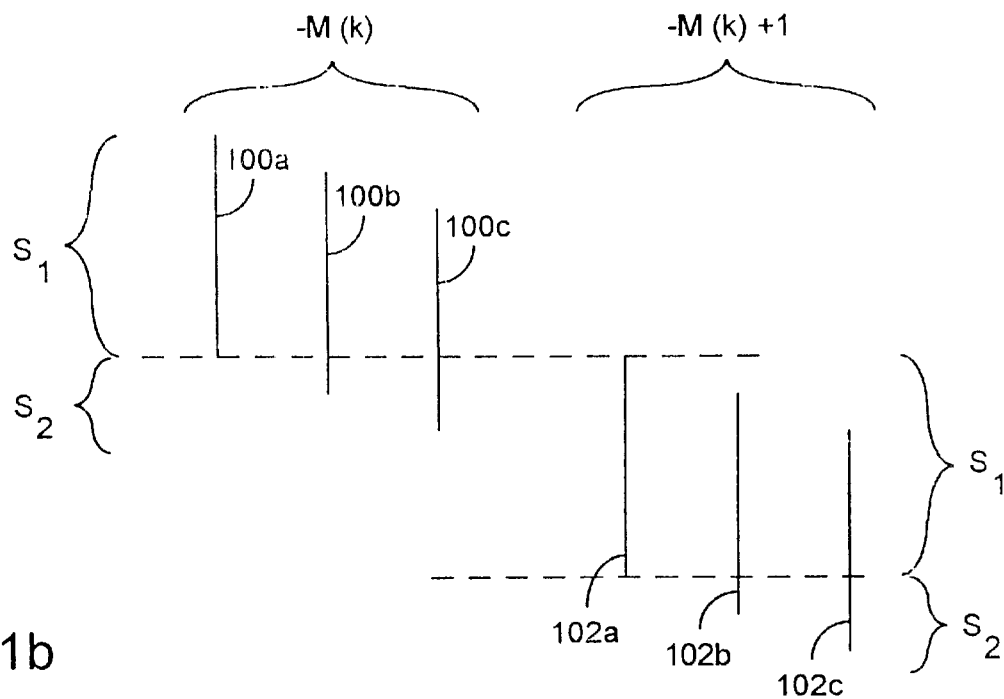

The received asynchronous CDMA signal r(t) usually takes the form:

$$r(t) = \sum_{k=1}^{K(t)} \sum_{m=-M(k)}^{M(k)} \sum_{l=1}^{L(t,k)} \alpha_{klm} b_{km} s_k(t - mT - d_{klm}) + w(t), \quad (1)$$

in which $\alpha_{klm}$ is complex channel attenuation, $b_{km}$ stands for the user's symbol, $s_k(t)$ stands for the user's broadband waveform (spreading code sequence), $d_{klm}$ represents delay caused by asynchronism, w(t) represents noise and T a symbol time-slot. The number of users K(t) is a function that varies with time, M(k) is the number of symbols to be transmitted and L(t,k) is the number of the received signal components, which depends on time and the user. L(t,k) varies as a function of time because the number of multipath-propagated signal components of various users varies with time. The same equation (1) may also be expressed as a vector $$r = S_d A b + w, \quad (2)$$

wherein $b=(b_{km})$, $A=\text{diag}(a)$, in which $a=(\alpha_{klm})$, w is a noise term and $S_d$ a matrix containing the waveforms of the users, the form of said matrix being illustrated by means of the example according to FIGS. 1a and 1b. In FIG. 1a, $S_d$ is a matrix along whose diagonal two partly overlapping waveform matrices $S_1$ and $S_2$ pass, the rest of the matrix containing zero terms.

FIG. 1b illustrates the content of waveform matrices $S_1$ and $S_2$ in greater detail. In the example, it is assumed that the number of users is three and, for the sake of simplicity, each user has a single-path channel. -M(k) stands for an assumed first received group of symbols which is transmitted by the users, and it thus contains symbols 100a–100c of each three users, said symbols arriving at the receiver at slightly different times due to delays and different propagation routes. $S_1^{(-M(k))}$ contains the symbol information of the users in so far as they are simultaneous with the symbol 100a of the first user. $S_2^{(-M(k))}$ contains the symbol information of the users in so far as they are not simultaneous with the symbol 100a of the first user. (-M(k)+1) contains the second received symbol information 102a–102c. 102a corresponds to a second symbol information of the first user, and 102b and 102c the symbol information of the second and the third user, respectively. The division between $S_1^{(-M(k)+1)}$ and $S_2^{(-M(k)+1)}$ is carried out in the way described above.

Alternatively, the equation may also be expressed in the form:

$$r = S_d u + w,$$

in which u=Ab. From this equation the estimate û of the desired variable u may be found directly with the formula:

$$\hat{u} = (S_d^H S_d)^{-1} S_d^H r, \quad (3)$$

which may also be expressed as $$(S_d^H S_d)\hat{u} = S_d^H r. \quad (4)$$

A direct solution is demanding in view of calculations due to matrix inversion operations.

In the method of the invention, iterative solving methods for linear equation groups are applied for solving equation (1). Suitable methods include e.g. a steepest descent method and particularly the conjugate-gradient (CG) method. The CG method is disclosed in greater detail e.g. in J. Stoer, R. Bulirsch: Introduction to numerical analysis, Springer-Verlag, 1983, pp. 572–576, which is incorporated herein by reference.

Figure 1C:
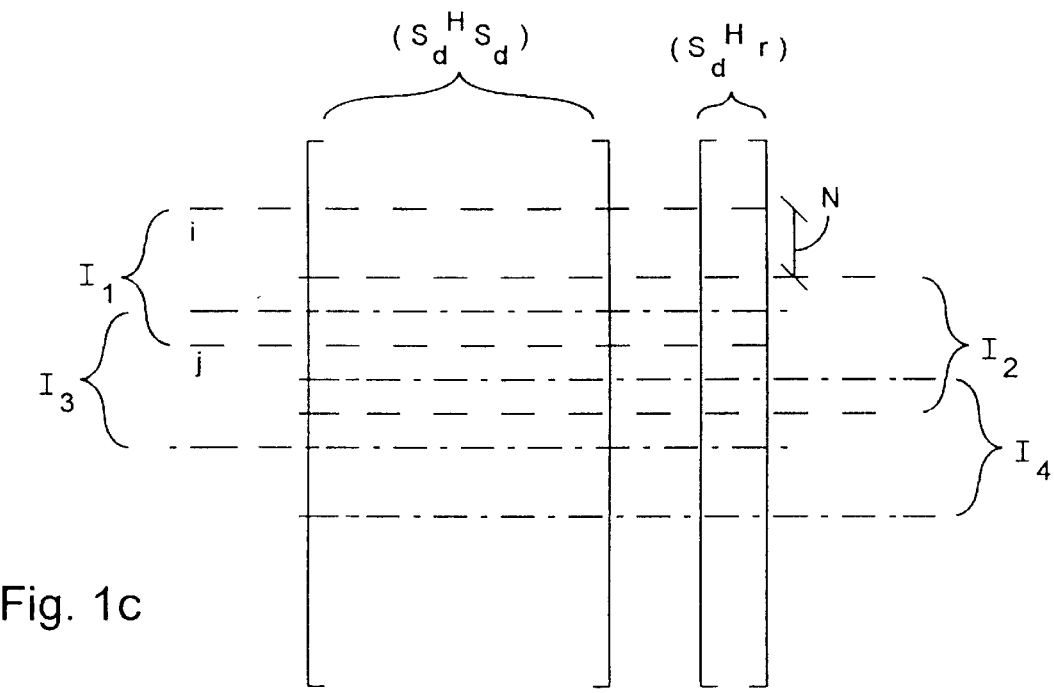
FIG. 1c illustrates selection of observation time-slots.

Let us study the solution of equation (3) by means of the method of the invention. The simplified matrix representation of the solution to the equation takes the form $Y=[S_d|r]$. Let us study FIG. 1c. The figure is a schematic illustration of part of matrix equation (4). In the method of the invention, the equation may be solved locally with a sufficient accuracy by means of submatrices, i.e. observation time-slots in which unknown variables are found locally. In FIG. 1c submatrices are marked with $I_1$–$I_4$. Submatrix $I_1$ contains the area between i and j of the initial matrix. From this submatrix, the unknown parameters û are found in accordance with the equation $$(S_d^H S_d)_{I1} \hat{u}_{I1} = (S_d^H r)_{I1}.$$

$\hat{u}_{I1}$ thus refers to those parameters that provide a solution on the basis of the information within the area between rows i and j.

Following this, the observation time-slot is shifted so that the new time-slot $I_2$ is the area between i+N and j+N. N is selected so that the previous and the new observation time-slot, $I_1$ and $I_2$, partly overlap. N is typically the number of samples corresponding to one symbol time-slot. From this submatrix, the unknown parameters U are found in accordance with the equation $$(S_d^H S_d)_{I2} \hat{u}_{I2} = (S_d^H r)_{I2}$$

by applying the conjugate-gradient or some other iterative method. $\hat{u}_{I2}$ thus refers to those parameters to which a solution is found on the basis of the information within the area between rows i+N and j+N. Since $I_1$ and $I_2$ thus partly overlap, there are unknown variables in common within their areas. When the conjugate-gradient or some other iterative method is applied, the unknown values that are common to both equations determined by successive time-slots, that is, the unknown variables between rows i+N and j, are employed as initial values of the unknown parameters from the solutions of the previous observation time-slot $\hat{u}_{I1}$. For new unknown variables within rows i+1, j+N, the initial values employed are $(S_d^H r)_{(i+1,j+N)}$, that is, estimates obtained from the previous receiver stage for the parameters in question. The same principle is applied when the following observation time-slots, that is, submatrices I3, I4 etc. are concerned. The value to be used for N, said value determining the overlapping of the successive observation time-slots, the size of the time-slot and the number of iterations depend on the accuracy desired for the estimates, the error probability desired for the decisions and the features of the model matrix $S_d$.

Not all the solutions contained by each submatrix solution vector $\hat{u}_I$ are equally accurate. The solutions located in the middle of the observation time-slot are the most accurate of the solutions contained by the vector, and in a preferred embodiment of the invention, they are selected as the final estimates of the samples in question, said estimates being typically used as input variables for subsequent post-processing units, such as a decoder or a channel estimator.

Figure 2:
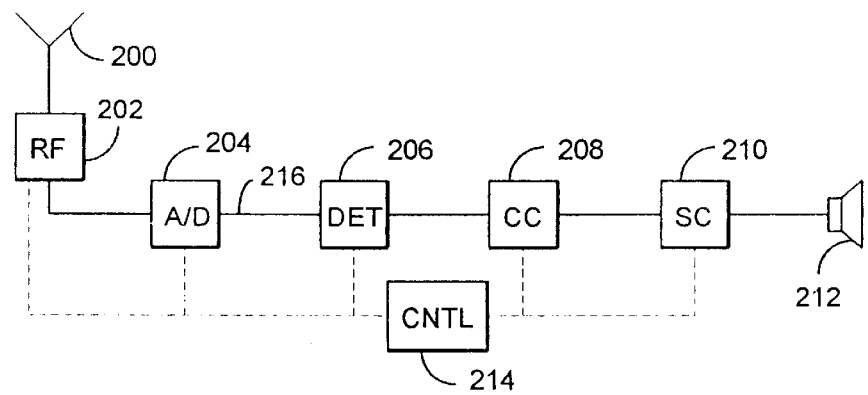
FIG. 2 is a block diagram illustrating the structure of a receiver of the invention.

In the following, let us study the structure of a receiver of the invention. FIG. 2 is a block diagram illustrating the structure of a receiver of the invention. The figure shows a receiver of a subscriber terminal station, but the receiver of the invention may of course be placed in a base station also, and its essential parts, that is, the implementation of the detector blocks, in particular, are similar to those of a terminal station. The receiver of the invention comprises an antenna 200, and a signal received by means of the antenna is applied to radio frequency parts 202, at which the signal is converted onto an intermediate frequency. From the radio frequency parts the signal is applied to an analog-to-digital converter 204, in which samples are taken from the signal and converted into digital form. A converted signal 216 is applied to a detector block 206, in which detection of channel parameters of the signal and of the desired symbols contained therein is carried out. The signal detected in the receiver of the terminal station shown in FIG. 2 is applied to a channel decoder 208 and a speech decoder 210, whereafter the decoded speech signal is applied to a loudspeaker 212. In the case of a base station receiver, the signal is applied to other parts of the receiver subsequent to the channel coding block. The receiver of the invention further comprises control means 214 for controlling the operation of other elements.

Figure 3:
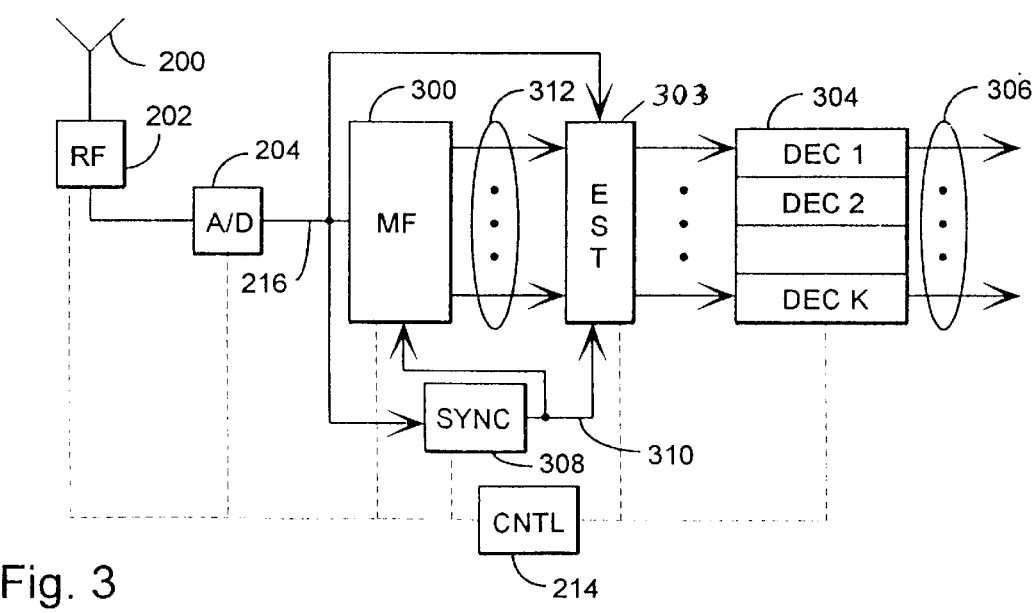
FIG. 3 illustrates the implementation of the receiver of the invention in greater detail, paying special attention to a detector.

In the preferred embodiment of the invention, the receiver is a multistage receiver, in which a received signal is detected by employing two or more detection stages. In the first stage of the receiver, preliminary estimates are calculated for the desired parameters. In the solution according to the invention, estimates are calculated iteratively in one of the latter stages, using a sliding observation time-slot. FIG. 3 is a block diagram illustrating the implementation of the receiver of the invention in closer detail, paying special attention to the detector. For the sake of simplicity, the following figure shows the receiver in a single-path channel, but it is obvious that the receiver of the invention may also be employed in a multipath channel.

The receiver of FIG. 3 comprises as a first stage a matched filter bank 300, to which the signal 216 is applied from an output of the converter 204. The receiver further comprises means 308 for synchronizing with the received signal, in which means the delays of various signals are thus estimated from the received signal 216. Synchronization may be carried out in a manner known to persons skilled in the art. Delay estimates 310 are applied to the matched filter bank 300. Preliminary estimate samples 312 obtained from the matched filter bank are forwarded to a multiuser detector 303, in which the received signal is estimated more accurately with the iterative method of the invention. From the detector the signal is further applied to prior art decoding means 304, which provide data decisions 306 which are applied to other parts of the receiver. In the example of the figure the number of users is assumed to be K.

It must be noted that in the receiver of the invention, the signal may also be converted into digital form in other stages of the reception chain than shown in the attached figure. Sampling and digitizing may e.g. be carried out only after the matched filters 300.

Figure 4A:
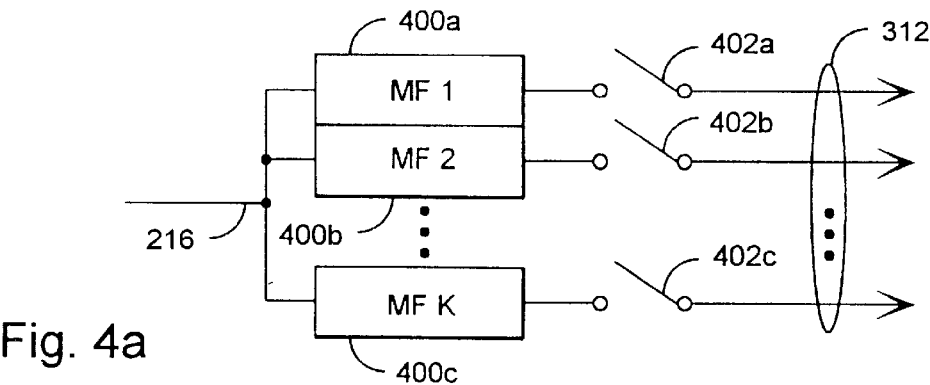
FIGS. 4a and 4b illustrate two possible ways of implementing a matched filter bank.

In the following, let us study the implementation of a matched filter bank, which may be implemented in the receiver of the invention in manners known to a person skilled in the art. FIG. 4a illustrates a possible way to implement a matched filter bank 300. A digitized signal 216 is applied to a group of filters 400a–400c matched with spreading codes of the received signal. Samples are taken from the output signal of the matched filters by means of sampling means 402a–402c. Samples are taken at intervals of $t = nT + \tau_k$, where T is a symbol time-slot, n represents a positive integer number, and $\tau_k$ stands for the delay of the $k^{th}$ user, which is obtained from a synchronization block 308 (in FIG. 3).

Figure 4B:
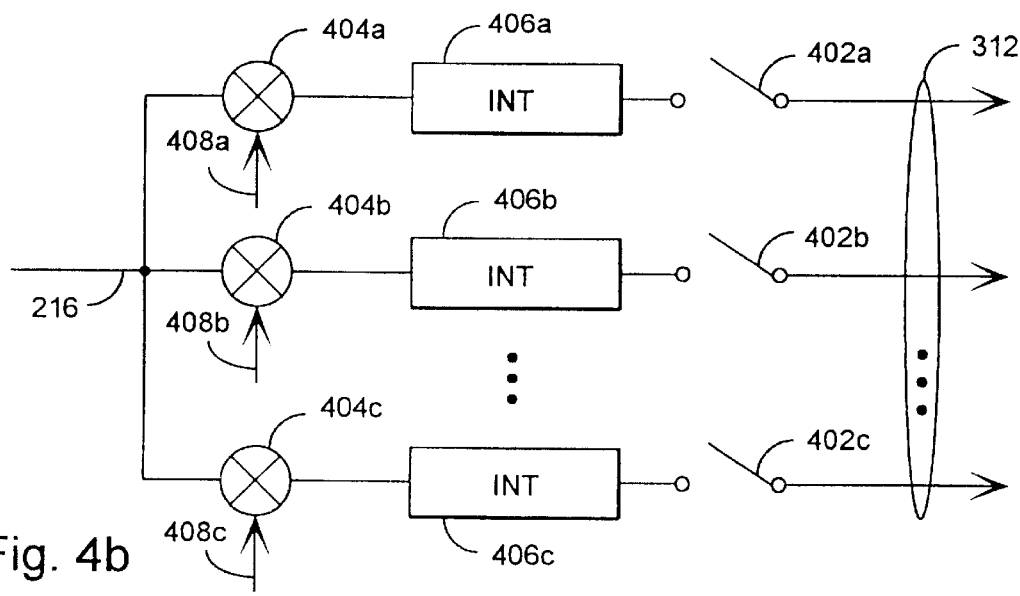

FIG. 4b illustrates a second possible way of carrying out a matched filter bank 300 using correlators. A digitized signal 216 is applied to multipliers 404a–404c, at which the signal is multiplied by spreading codes 408a–408c of the users. The multiplied signal is applied to a group of summing means 406a–406c, from whose output signal samples are taken by means of sampling means 402a–402c, as it has been described above. In both implementation alternatives described above, the output signal 312 of the matched filter bank contains preliminary estimates of the received symbols, said estimates being further applied to an estimator 302.

Figures 5A, 5B:
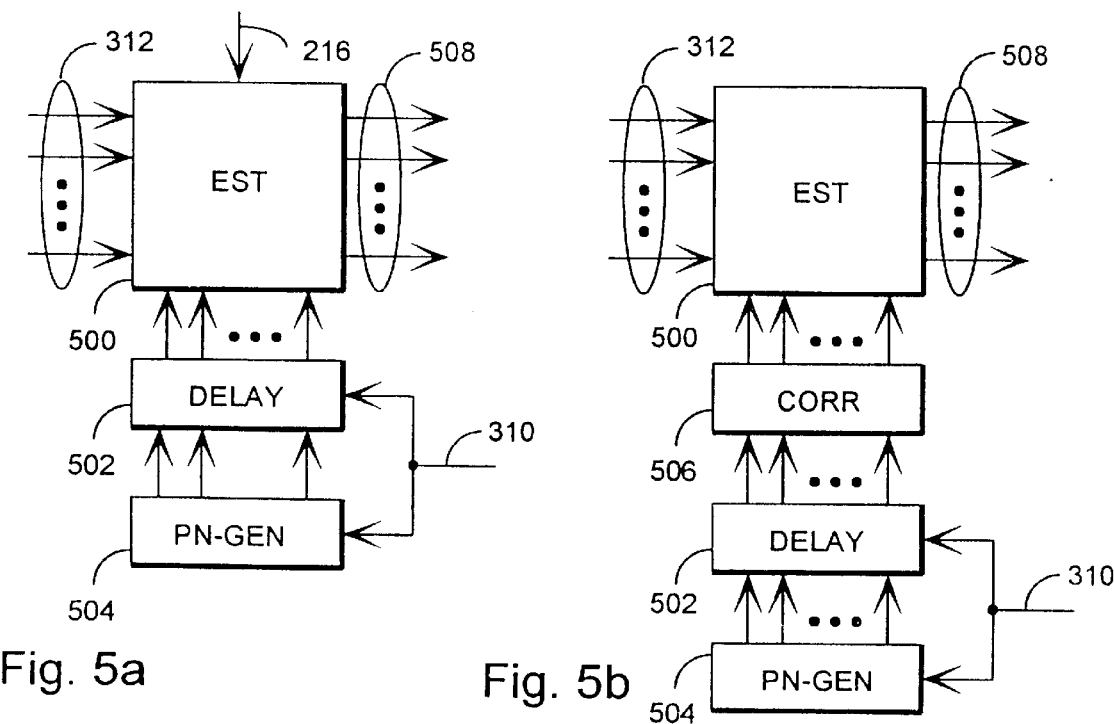
FIGS. 5a and 5b are block diagram illustrations of an implementation of an iterative detector block.

In the following, let us study the structure of a detector 303 of the receiver according to the invention. As mentioned above, the received signal is estimated in the detector with an iterative method of the invention in closer detail. FIG. 5a is a block diagram illustrating a preferred embodiment of implementing the detector of the invention. The detector comprises a spreading code generator, which generates the required spreading codes of various users. The codes are applied to a delay means 502, at which each code is brought into a correct phase on the basis of delay information 310 received from a synchronization block. The delay means may be carried out e.g. by means of a shift register. Spreading codes that have been brought into correct phase are applied to an actual detector block 500, to which a signal 312 from the previous stage is applied, as well a signal 216 directly from the analog-to-digital converter.

In the detector block 500, the iterative algorithm described above is carried out for estimating the desired signal parameters, such as symbol information, by observing the signal 216 by means of a limited observation time-slot and by sliding the time-slot in such a manner that successive time-slots partly overlap. The detector block 500 may be carried out e.g. by means of a digital general-purpose signal processor or a programmable gate logic for carrying out the corresponding operations, as well as by means of an off-line processor implementation, such as an ASIC circuit or other microprocessor-based implementation. The results from the previous iteration cycle are thus employed as the initial values of the iteration provided that they are available, as well as the results 312 of the estimation obtained from the previous stage of the receiver. The symbols 508 calculated in the detector block are further applied to the decoder of the receiver. The advantage of the implementation is the fact that there is no need to calculate the correlations of the spreading codes. The correlations may vary with time and thus require updating.

FIG. 5b is a block diagram illustration of a second preferred embodiment of the detector. This implementation differs from the first one in that the receiver comprises means 506 for calculating cross-correlations of the spreading codes on the basis of delay information 310. Calculating the correlations may easily be carried out by means of signal processing, as is obvious to a person skilled in the art.

Although the invention has been explained above with reference to the examples in the attached drawings, it is obvious that the invention is not limited thereto, but it may be modified in a variety of ways within the scope of the inventive idea set forth in the attached claims.

We claim:

1. A receiving method comprising the steps of: taking samples from a received signal, measuring from the received signal mutual delays of transmissions contained in the signal and the strengths of the transmissions originating from one or more transmitters, and calculating estimates for parameters of the received signal in two or more receiver stages, the signal being processed iteratively in one of the latter stages by means of a sliding observation time-slot of a given length, containing a plurality of samples, wherein successive observation time-slots are partly overlapping, estimates and decisions provided by the previous observation time-slot are used as initial values for those samples that fall within the previous observation time-slot upon calculating the estimates of the parameters in each observation time-slot, and estimates provided by the previous stage are used for those samples that do not fall within the previous observation time-slot.

2. A method as claimed in claim 1, further comprising the step of selecting as a final estimate of each parameter the value that has been calculated in the middle of the observation time-slot.

3. A method as claimed in claim 1, further comprising the step of the signal parameters to be estimated containing received symbols of several users.

4. A method as claimed in claim 1, further comprising the step of the signal parameters to be estimated containing complex amplitudes.

5. A method as claimed in claim 1, further comprising the step of determining the size of the observation time-slot on the basis of the accuracy desired for the estimates and the error probability desired for the decisions.

6. A method as claimed in claim 1, further comprising the step of determining the size of the overlapping parts of successive observation time-slots on the basis of the accuracy desired for the estimates and the error probability desired for the decisions.

7. A method as claimed in claim 1, further comprising the step of determining the number of iterations on the basis of the accuracy desired for the estimates and the error probability desired for the decisions.

8. A receiver comprising means for measuring from a received signal mutual delays of transmissions contained by the received signal, and strengths of transmissions received from one or more transmitters, means that are arranged to calculate estimates for parameters of the received signal in two or more stages, means for taking samples of the received signal, means for processing the signal iteratively by means of an observation time-slot of a given length and containing a plurality of samples, and means for sliding the observation time-slot over the received samples, wherein the receiver further comprises:

means for sliding the observation time-slot in such a way that successive observation time-slots partly overlap, and means for employing, upon calculating the estimates and decisions of parameters in each observation time-slot, estimates provided by the previous observation time-slot as initial values for those samples that fall within the previous observation time-slot, and estimates provided by the previous stage for those samples that do not fall within the previous observation time-slot.

9. A receiver as claimed in claim 8, further comprising means for selecting as a final estimate of each parameter the value that has been calculated in the middle of the observation time-slot.

10. A receiver as claimed in claim 8, further comprising means for adjusting the size of the observation time-slot on the basis of the accuracy desired for the estimates and the error probability desired for the decisions.

11. A receiver as claimed in claim 8, further comprising means for adjusting the number of iterations on the basis of the accuracy desired for the estimates and the error probability desired for the decisions.

12. A receiver as claimed in claim 8, further comprising means for adjusting the size of the overlapping parts of the successive observation time-slots on the basis of the accuracy desired for the estimates and the error probability desired for the decisions.

13. A receiver as claimed in claim 8, further comprising means for generating the spreading codes required for reception and means for bringing the generated spreading codes in phase with the received signal.

* * * * *